May 28, 1968  B. E. NORMAN  3,385,141
OIL FILTER GLOVE HAVING INTERNAL SPACED
FILTER ENGAGING ELEMENTS
Filed Sept. 23, 1966

Inventor
BENTON E. NORMAN
By
Attorney

United States Patent Office 3,385,141
Patented May 28, 1968

3,385,141
OIL FILTER GLOVE HAVING INTERNAL SPACED
FILTER ENGAGING ELEMENTS
Benton E. Norman, 501 Vermelle,
Hot Springs, Ark. 71901
Filed Sept. 23, 1966, Ser. No. 581,493
2 Claims. (Cl. 81—90)

ABSTRACT OF THE DISCLOSURE

An oil filter removing boot with imperforate bottom and side wall embracing the oil filter. The side wall is spaced from the oil filter by spacers which grip the filter. In a preferred embodiment the spacers are axial strips on the side wall. In another embodiment the spacers are pivoted dogs on the side wall.

Oil filter glove

This invention relates to an oil filter glove for removing oil filters from internal combustion engines. It has particular utility as applied to removing oil filters from automobiles having downwardly extending filters which are removable only from beneath the car.

Many modern automobiles have oil filters which are attached to a downwardly extending threaded nipple. When the oil filter is to be changed, the automobile is raised on a rack and the filter is unscrewed from beneath the car. Removing the filter is often a difficult job because it is crowded by surrounded machinery. Some oil filters must be loosened with a band wrench or the like, while others are provided with a polygonal lug welded to the bottom to facilitate removal with a socket wrench or the like. After the oil filter is loosened, oil in the line or nipple above the oil filter begins to leak out. Since the oil filter is full of oil, this excess oil runs down the sides of the filter and onto the hands of the person removing the filter. The most common way to avoid this problem has been to use rags wrapped around the oil filter when it is removed. This method has not proved very effective, particularly when, as is often the case, the oil is very hot. Other methods have been devised using various tools to grasp the bottom of the oil filter but these have also suffered from certain disadvantages.

One of the objects of this invention is to provide a device for removing an oil filter which will completely protect the user from oil dripping over the top of the filter.

Another object of this invention is to provide such a device which is easily placed in position for removing a filter, but which once placed in position will grasp the filter firmly.

Other objects will occur to those skilled in the art in the light of the following description and accompanying drawing.

Summary of the invention

In accordance with this invention, generally stated, a glove for removing an oil filter is provided in the form of a hollow boot having a bottom wall and a side wall proportioned to embrace the oil filter. The side wall is provided with spacers which space the side wall from the oil filter around its entire periphery. The spacers are designed to move away from the oil filter to allow the boot to be inserted around the oil filter, but are biased to engage the oil filter when the boot is in position. The spacing means thus not only hold the side wall of the boot away from the side of the oil filter to catch any oil which spills over, but also grip the smooth side of the oil filter to facilitate its removal.

Description of the preferred embodiments

Figure 3:
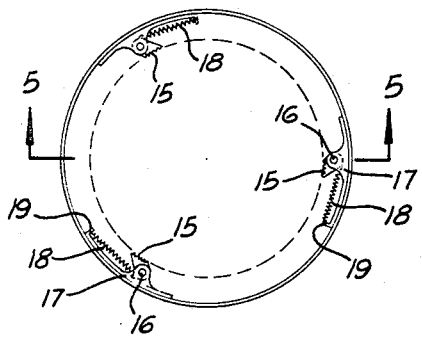
FIGURE 3 is a top plan view of the oil filter glove shown in FIGURE 2.
Figure 1:
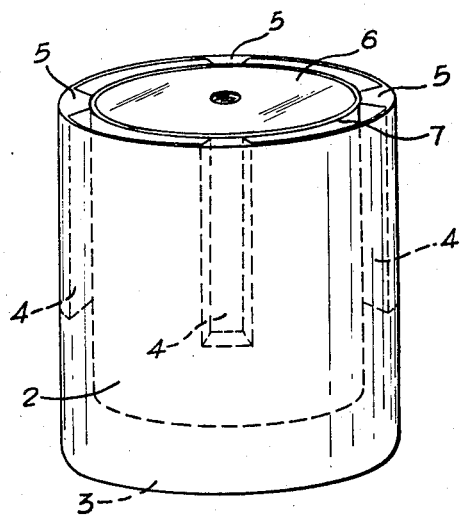
FIGURE 1 is a view in perspective of one embodiment of an oil filter glove of this invention, holding an oil filter.
Figure 2:
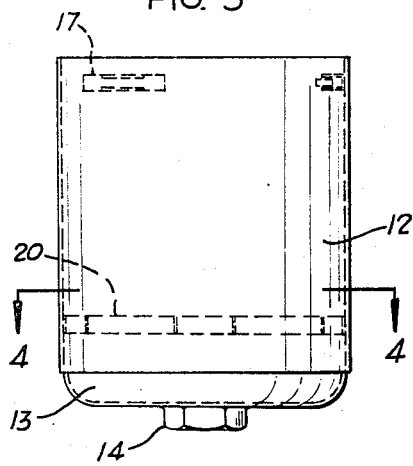
FIGURE 2 is a view in side elevation of another embodiment of oil filter glove of this invention.
Figure 4:
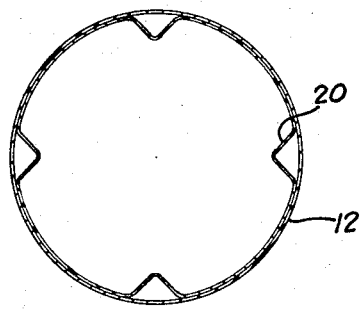
FIGURE 4 is a sectional view taken along line 4—4 of FIGURE 2.
Figure 5:
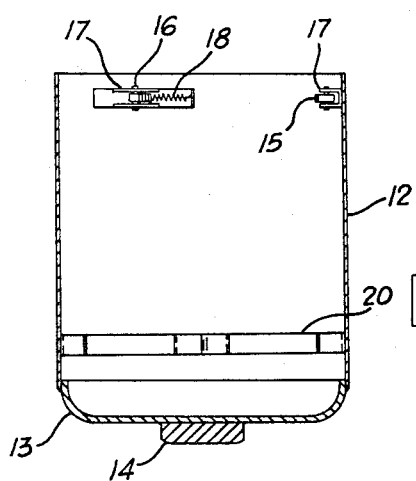
FIGURE 5 is a sectional view taken along line 5—5 of FIGURE 3.
Figure 6:
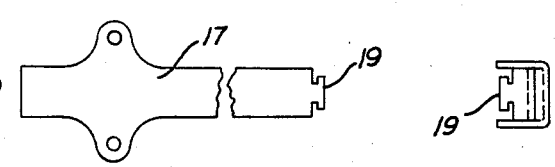
FIGURE 6 is a detail showing a blank for one of the spacer supports of this embodiment.
Figure 7:
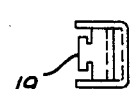
FIGURE 7 is a view in end elevation of the support shown in FIGURE 6 in its final form.

Referring now to FIGURE 1 for one illustrative embodiment of the oil filter glove of this invention, reference numeral 1 indicates a boot having a side wall 2 and a bottom wall 3 made of a tough resilient material such as polyethylene. Attached to the side wall are spacers 4. The boot 1 and the spacers 4 are so proportioned that the diameter of a circle bounded by the inside faces of the spacers 4 is slightly less than the diameter of a standard oil filter. The upper faces 5 of the spacers 4 are preferably beveled to facilitate slipping the glove over the oil filter 6.

The spacers 4 are preferably rather thin and are molded as an integral part of the boot. This construction allows the entire boot to be molded as one piece, and therefore makes a very simple and rugged device. Although relatively thick spacers have the advantage of allowing wider variations in making the glove and of fitting filters of slightly different sizes, the narrow spacers are preferred because there is frequently very little clearance around the oil filter. The spacers are conveniently about one quarter of an inch thick. Since a standard oil filter 6 is approximately three and five eighths inches in diameter, except at its chine 7 where it is about three and three quarters inches in diameter, the boot 1 is conveniently made with an inside diameter of about four inches. It thus has an inside diameter of about three and one half inches between the inner faces of the spacers. If the spacers are one eighth of an inch thick, then the inside diameter of the boot should be about three and thirteen-sixteenths inches. The spacers must be at least this thick to hold the side wall of the boot beyond the chine 7 of the oil filter.

An oil filter is removed with this embodiment of glove by first loosening the oil filter 6 in a conventional way, slipping the boot onto the filter until the upper edges 5 of the spacers 4 engage the chine 7 of the oil filter 6, and then completing the removal with the boot 1. The side wall of the boot, being flexible, chords to some extent between the spacers 4 and is resilient enough to hold the oil filter 6 snugly and firmly and yet to allow easy removal of the oil filter from the glove after it has been removed from the automobile.

Although the embodiment hereinabove described in which the side wall 2 of the boot is flexible and resilient, is the preferred embodiment of the oil filter glove of this invention because of its simplicity, other embodiments, having other advantages, are possible. For example, in the embodiment shown in FIGURES 2–7 a side wall 12 of a boot 11 is made of a rigid material, preferably of stainless steel. The bottom wall is in the form of a relatively heavy cupped end bell 13 welded to the side wall 12 around its periphery and having welded at the center of its outer face a hexagonal lug 14. The movable spacing means of this embodiment comprise three independent toothed dogs 15 pivotally mounted on pins carried by support brackets 17. The toothed edge of each dog 16 is biased radially inwardly by a spring 18 attached at one of its ends to the dog 16 and at its other end to a post 19 on the support bracket 17. The support bracket 17 may be attached to the wall 12 of the boot by any conventional means, such as cementing, welding or riveting. Near the bottom of the side wall 12 a second set of spacers 20 is mounted. The function of the spacers 20 is merely to keep the boot from cocking on the oil filter. Therefore, they are adapted to receive the oil filter loosely, and have no dogging arrangement.

The boot 11, dogs 15 and support brackets 17 are proportioned to give about one half inch clearance between the inner edge of the side wall 12 and the oil filter. The dogs 15 are so shaped and so mounted that they can be moved to a neutral, non-engaging, position, to permit the reception of the oil filter 7.

The boot is put in place over an oil filter by pushing it up the sides of the filter 6 with a screwing motion, turning it in a clockwise direction, thereby urging the toothed face of the dog 15 away from engagement with the oil filter and into the neutral position, until the support brackets 17 engage the chine 7 of the filter. A slight counter-clockwise turn causes the teeth of the dogs 15 to grip the side of the oil filter and holds the boot 11 in place. The filter is then removed by turning the boot counterclockwise, using a wrench on the lug 14 is necessary. When the filter has been removed and the oil emptied from it, the dogs may be pushed into the neutral position by turning the can and boot relative to one another, and the filter slipped out.

Numerous other variations within the scope of the appended claims will occur to those skilled in the art in the light of the foregoing disclosure. For example, in the embodiment in which the side wall of the boot is flexible, the side wall may not be perfectly cylindrical, but rather in the shape of a frustum, with its base at the top of the boot. Supplemental grippings means in the form of rough or sharp instrumentalities, may be embedded in or carried by the spacers 4. In the embodiment in which the side wall of the boot is rigid, the spacing means may be of different shape, may be mounted pivotally on another axis, or may move into engaging position with the oil filter in response to the glove's abutting the chine of the oil filter, rather than being normally biased toward this position. Likewise it may be found convenient to have only one of the spacing means movable into and out of engagement with the oil filter. The spacing means may also be attached to the bottom wall of the boot rather than the side wall, but this construcion is felt to be cumbersome. These variations are merely illustrative.

Having thus described the invention, what is claimed and desired to be secured by Letters Patent is:

1. A glove for removing an oil filter from an internal combustion engine, comprising a hollow boot having a bottom wall and a side wall to embrace an oil filter, and means on said boot to engage said oil filter when said boot is placed in embracing position with said oil filter, said means comprising a plurality of strips on said side wall and running axially thereof, said boot forming an oil retaining receptacle when placed in embracing position with said oil filter.

2. The glove of claim 1 wherein said side wall is made of a flexible resilient material.

References Cited

UNITED STATES PATENTS

| | | | |
|---|---|---|---|
| 2,372,269 | 3/1945 | Golan. | |
| 2,514,687 | 7/1950 | Werner | 81—120 X |
| 3,066,559 | 12/1962 | Harvel et al. | 81—53 |
| 3,224,585 | 12/1965 | Scavuzzo et al. | 81—90 X |
| 2,746,330 | 5/1956 | Pfetzing | 81—53 |

FOREIGN PATENTS

| | | |
|---|---|---|
| 22,373 | 1896 | Great Britain. |

MILTON S. MEHR, *Primary Examiner.*